United States Patent
Varga et al.

(10) Patent No.: US 11,927,474 B2
(45) Date of Patent: *Mar. 12, 2024

(54) COMPOSITE PANE WITH AN INTEGRATED LIGHT SENSOR

(71) Applicant: SAINT-GOBAIN GLASS FRANCE, Courbevoie (FR)

(72) Inventors: Gabor Varga, Herzogenrath (DE); Bastian Klauss, Kempen (DE); Michael Zeiss, Heinsberg-Haaren (DE); Christian Effertz, Aachen (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 150 days.

This patent is subject to a terminal disclaimer.

(21) Appl. No.: 17/432,315

(22) PCT Filed: Feb. 5, 2020

(86) PCT No.: PCT/EP2020/052790
§ 371 (c)(1),
(2) Date: Aug. 19, 2021

(87) PCT Pub. No.: WO2020/169338
PCT Pub. Date: Aug. 27, 2020

(65) Prior Publication Data
US 2023/0168121 A1 Jun. 1, 2023

(30) Foreign Application Priority Data
Feb. 20, 2019 (EP) .................................... 19158255

(51) Int. Cl.
*G01J 1/04* (2006.01)
*B32B 17/10* (2006.01)
(Continued)

(52) U.S. Cl.
CPC ...... *G01J 1/0437* (2013.01); *B32B 17/10036* (2013.01); *B32B 17/10357* (2013.01);
(Continued)

(58) Field of Classification Search
CPC . G01J 1/0437; G01J 1/4204; B32B 17/10036; B32B 17/10357;
(Continued)

(56) References Cited

U.S. PATENT DOCUMENTS 5,081,347 A * 1/1992 Matsumoto ......... H01L 31/0203
257/E31.119
9,041,135 B2 * 5/2015 Janson .................. G01S 3/7861
257/435
(Continued)

FOREIGN PATENT DOCUMENTS

CN 107046805 A 8/2017
DE 10 2008 033204 A1 2/2010
(Continued)

OTHER PUBLICATIONS

International Search Report as issued in International Patent Application No. PCT/EP2020/052790, dated Mar. 3, 2020.
(Continued)

*Primary Examiner* — Jennifer D Bennett
(74) *Attorney, Agent, or Firm* — Pillsbury Winthrop Shaw Pittman LLP

(57) ABSTRACT

A composite pane and in particular to a composite vehicle pane with an integrated light sensor, includes an outer pane and an inner pane that are joined to one another via at least one thermoplastic intermediate layer, and at least one light sensor with a light-sensitive surface that is arranged between the outer pane and the inner pane, wherein the light-sensitive surface faces the outer pane, and a shadow mask that covers at least some portions of the light-sensitive surface is
(Continued)

arranged between the light-sensitive surface and the outer pane.

21 Claims, 9 Drawing Sheets

(51) Int. Cl.
*B60Q 1/00* (2006.01)
*B60Q 1/08* (2006.01)
*G01J 1/42* (2006.01)

(52) U.S. Cl.
CPC .... *B32B 17/1044* (2013.01); *B32B 17/10761* (2013.01); *B32B 17/1077* (2013.01); *B32B 17/10788* (2013.01); *B32B 17/10807* (2013.01); *B60Q 1/0023* (2013.01); *B60Q 1/08* (2013.01); *G01J 1/4204* (2013.01); *B32B 2307/4023* (2013.01); *B32B 2307/412* (2013.01); *B32B 2307/732* (2013.01); *B32B 2605/006* (2013.01)

(58) Field of Classification Search
CPC .......... B32B 17/1044; B32B 17/10761; B32B 17/1077; B32B 17/10788; B32B 17/10807; B32B 2307/4023; B32B 2307/412; B32B 2307/732; B32B 2605/006; B60Q 1/0023; B60Q 1/08
See application file for complete search history.

(56) References Cited

U.S. PATENT DOCUMENTS

| | | | |
|---|---|---|---|
| 9,902,318 | B1 | 2/2018 | Salter et al. |
| 11,703,383 | B2* | 7/2023 | Matheisen ........ B32B 17/10036 250/239 |
| 2003/0197114 | A1 | 10/2003 | Muesch et al. |
| 2018/0111356 | A1* | 4/2018 | Effertz ............. B32B 17/10788 |
| 2018/0326705 | A1 | 11/2018 | Effertz et al. |
| 2022/0128398 | A1* | 4/2022 | Matheisen .......... B32B 17/1077 |

FOREIGN PATENT DOCUMENTS

| | | |
|---|---|---|
| DE | 20 2018 102181 U1 | 5/2018 |
| EP | 2 100 722 A2 | 9/2009 |
| JP | H10-173158 A | 6/1998 |
| JP | 2005-335974 A | 12/2005 |
| JP | 2012-064716 A | 3/2012 |
| JP | 2013-007621 A | 1/2013 |
| JP | 2018-537376 A | 12/2018 |
| KR | 10-2018-0022932 A | 3/2018 |
| WO | WO 2017/097536 A1 | 6/2017 |

OTHER PUBLICATIONS

Supplemental Search Report as issued in Chinese Patent Application No. 202080000589.9, dated Apr. 15, 2023.
Notice of Reasons for Rejection as issued in Japanese Patent Application No. 2021-549261, dated Sep. 13, 2022.
Notice of Preliminary Rejection as issued in Korean Patent Application No. 10-2021-7026168, dated Jul. 19, 2023.

* cited by examiner

COMPOSITE PANE WITH AN INTEGRATED LIGHT SENSOR

CROSS-REFERENCE TO RELATED APPLICATIONS

This application is the U.S. National Stage of PCT/EP2020/052790, filed Feb. 5, 2020, which in turn claims priority to European patent application number 19158255.0 filed Feb. 20, 2019. The content of these applications are incorporated herein by reference in their entireties.

The invention relates to a composite pane and in particular to a composite vehicle pane with an integrated light sensor, a method for production thereof, and use thereof.

It is known to equip vehicles with light sensors to determine the amount of available daylight, and, on this basis, for example, to operate the vehicle headlights as needed. Conventional light sensors are installed as add-on parts, in particular on the interior-side surface of the windshield, for example, in the region of the rearview mirror.

From EP2100722A2, a light sensor is known, which is laminated into a windshield, i.e., is arranged between the outer pane and the inner pane of the windshield, wherein the panes are bonded to one another by a thermoplastic intermediate layer. Thus, the windshield can be provided, in a compact manner, with the integrated light sensor; subsequent mounting of the light sensor is eliminated. The light sensor is implemented in the form of flip-chip photodiodes on a printed circuit board.

The object of the present invention is to provide a further improved composite pane having an integrated light sensor.

The object of the present invention is accomplished according to the invention by a composite pane according to claim 1. Preferred embodiments emerge from the subclaims.

The composite pane according to the invention and in particular the composite vehicle pane according to the invention comprises at least
- an outer pane and an inner pane that are joined to one another via at least one thermoplastic intermediate layer, and
- at least one light sensor with in each case a light-sensitive surface that is arranged between the outer pane and the inner pane, wherein
- the light-sensitive surface of the light sensor faces the outer pane, and
- a shadow mask that covers at least some portions of the light-sensitive surface is arranged between the light-sensitive surface and the outer pane.

The present invention further relates to a light sensor comprising:
- a light-sensitive surface and
- a shadow mask that is arranged on the side of the light sensor that faces the light-sensitive surface,
wherein the shadow mask at a distance a from the light-sensitive surface and the shadow mask covers at least some portions of the light-sensitive surface.

The present invention further relates to a single pane with a light sensor according to the invention comprising:
- at least one light sensor with a light-sensitive surface and an outer pane,
wherein
- the light-sensitive surface of the light sensor faces the outer pane, and
- a shadow mask that covers at least some portions of the light-sensitive surface is arranged between the light-sensitive surface and the outer pane. Here, the outer pane is synonymous with the single pane.

The light sensor according to the invention, the single pane according to the invention, and the composite pane according to the invention allow the direction of incident light to be determined by partial shading of the light-sensitive surface of the light sensor and by utilizing the geometric beam path, as explained in detail in the description concerning FIGS. 1A and 1B.

It goes without saying that the preferred exemplary embodiments below apply to the light sensor according to the invention, the single pane according to the invention, and the composite pane according to the invention to the extent this is technically possible.

In an advantageous embodiment of the invention, the distance a between the light-sensitive surface and the shadow mask is from 100 µm to 10000 µm and preferably from 500 µm to 1500 µm. With such distances a, particularly good results can be achieved in terms of the shading and the geometric beam path.

In an alternative advantageous embodiment of the invention, the distance a between the light-sensitive surface and the shadow mask is from 50% to 150% and preferably from 75% to 125% of the width or the length of the light-sensitive surface. With such distances a, particularly good results can be achieved in terms of the shading and the geometric beam path.

The composite pane according to the invention with an integrated light sensor comprises at least an outer pane and an inner pane that are joined to one another via a thermoplastic intermediate layer. As a composite vehicle pane, it is provided to separate a vehicle interior from an external environment. The composite vehicle pane is thus a window pane that is inserted in a window opening of the vehicle body or is intended for that purpose. The vehicle pane according to the invention is, in particular, a windshield, roof panel, or rear window of a motor vehicle. The term "inner pane" refers to that pane that faces the interior of the vehicle in the installed position. The term "outer pane" refers to that pane that faces the external environment of the vehicle in the installed position. The thermoplastic intermediate layer is typically formed from at least one thermoplastic film.

That surface of the respective pane that faces the external environment of the vehicle in the installed position is referred to as the "exterior-side surface". That surface of the respective pane that faces the interior of the vehicle in the installed position is referred to as the "interior-side surface". The interior-side surface of the outer pane is joined to the exterior-side surface of the inner pane via the thermoplastic intermediate layer. Customarily, the exterior-side surface of the outer pane is referred to as "side I"; the interior-side surface of the outer pane as "side II"; the exterior-side surface of the inner pane as "side III"; and the interior-side surface of the inner pane as "side IV".

In an advantageous embodiment, the light sensor according to the invention has exactly one light-sensitive surface. This means that the light-sensitive surface of an individual light sensor is not further segmented and that the measurement signal that is output by the light sensor summarizes the amount of light striking the light-sensitive surface. It goes without saying that the light-sensitive surface is not a mathematical area, but, rather, a light-sensitive layer with a certain layer thickness, which is, however, usually significantly less than its lateral extent.

The light-sensitive surface of the light sensor according to the invention faces the outer pane. This means that only light that enters the composite pane via the outer pane can reach the light-sensitive surface of the light sensor and the light sensor reacts only to this light.

The light-sensitive surface is advantageously completely covered with a protective layer and preferably with a transparent protective layer that protects the exposed surface of the light-sensitive surface against mechanical and chemical damage, for example, against moisture. The transparent protective layer is particularly preferably arranged between the light-sensitive surface and the outer pane and directly on the light-sensitive surface. It goes without saying that the protective layer can also have other passive or functional properties.

The protective layer is preferably transparent or sufficiently transparent to the detection wavelength range of the light sensor. This means, advantageously, that the transmittance for the wavelength range for which the light sensor is technically designed is more than 20%, preferably more than 50%, particularly preferably more than 70%, and in particular more than 90%.

The protective layer is arranged on the side of the light sensor facing the outer pane and directly on the light-sensitive surface. It goes without saying that the protective layer at least completely covers the light-sensitive surface, but can also project beyond the light-sensitive surface, which is usually the case.

Furthermore, a shadow mask, which covers at least some portions of the light-sensitive surface, is arranged between the light-sensitive surface and the outer pane.

In an advantageous embodiment of a shadow mask according to the invention, the shadow mask completely covers exactly a first area of the light-sensitive surface, but not a second area of the light-sensitive surface, i.e., the second area is completely uncovered.

Here, "covered area" means, in particular, the area of the light-sensitive surface that is shaded in the event of orthogonal light incidence on the shadow mask (or on the protective layer). In other words, the shadow mask is arranged in orthogonal projection in sections above the light-sensitive surface.

In an advantageous embodiment of a light sensor according to the invention, the protective layer comprises one or more layers, preferably containing or consisting of silicon oxide and/or silicon nitride.

In another advantageous embodiment of a light sensor according to the invention, the thickness d of the entire protective layer is from 10 nm to 1000 nm.

In an advantageous embodiment of a light sensor according to the invention, the shadow mask is implemented such that it is non-transparent to light in the detection wavelength range of the light sensor or has only low transparency there. Preferably, the transmittance for light in the detection wavelength range of the light sensor through the shadow mask is less than or equal to 50%, particularly preferably less than or equal to 30%, even more preferably less than or equal to 10%, even more preferably less than or equal to 5%, and in particular less than or equal to 2%.

In an advantageous embodiment of a light sensor according to the invention, the shadow mask is arranged directly on the protective layer and/or on a surface of the housing of the light sensor and/or on the interior-side surface II of the outer pane. It goes without saying that the shadow mask can simultaneously have direct contact with the protective layer and the interior-side surface II of the outer pane arranged above it. It further goes without saying that additional layers and/or electrical leads that contribute to a defined distance d between the shadow mask and the light-sensitive surface can be arranged between the shadow mask and the light-sensitive surface.

In another advantageous embodiment of a light sensor according to the invention, the shadow mask contains or comprises at least one color layer, in particular with black color. Here, the color layer is preferably applied directly onto the protective layer and/or onto a surface of the housing of the light sensor, in particular by printing or stamping. This is particularly advantageous since the shadow mask can be applied to the light sensor simply and with high accuracy prior to assembly in the composite pane, and can no longer slip during assembly or thereafter. The color layer preferably consists of a primer or an acrylic or synthetic resin paint.

It goes without saying that the shadow mask can also be applied directly on the interior-side surface of the outer pane and can, for example, consist completely or partially of an opaque masking print, as it is customarily used in composite vehicle panes.

Alternatively, or in combination, the shadow mask can contain or consist of one or more films, optionally with adhesive layers. The surface of the film visible from the outside, i.e., the sides facing the outer pane, is then preferably black or provided with a black coloration.

Particularly suitable in this regard are metal foils or metallized polymer films since they have only low light transmittance, even with a low material thickness.

In an advantageous embodiment of a light sensor according to the invention, the shadow mask has a sharp edge between a first area covering the protective layer and a second area not covering the protective layer. In other words, the side surface of the shadow mask is as straight as possible and extends substantially at a 90°-angle relative to the extended sides of the shadow mask.

In another advantageous embodiment of a light sensor according to the invention, the edge of the shadow mask along the boundary line between the first area and the second area is rectilinear, slightly curved, or orthogonal.

In an advantageous embodiment of a composite pane according to the invention, the light sensor(s) are arranged on at least one printed circuit board, preferably on at least one flexible printed circuit board and contacted thereon with conductor tracks. This enables easy connection of the light sensors to corresponding evaluation electronics of the vehicle.

Depending on the measured origin of an ambient light, the switching state of the headlights can, for example, be controlled automatically by the evaluation and control electronics. Thus, convenience is enhanced for the vehicle driver, who no longer has to take care of manually turning the headlights on and off. Other applications are, for example, automatic electrical switching of the transmittance properties of the entire pane or a pane area and the brightness control of display elements in the vehicle interior.

Due to their small dimensions, SMD components are particularly suitable for use as light sensors according to the invention that are to be laminated into a composite pane. As is generally known to the person skilled in the art, SMD is the acronym for the term surface-mounted device. SMD components have no wire connections, but are, instead, soldered directly onto the printed circuit board by means of solderable connection pads. Conventional components must be routed through mounting holes and soldered on the back of the printed circuit board. This is eliminated with SMD components. Thus, very dense mountings become possible, reducing space requirements. Advantageously from a process technology standpoint, the drilling of holes in the printed circuit board is eliminated. Weight is reduced by smaller components and the elimination of connecting wires. SMD technology is also particularly suitable for automated mounting (automated picking and placing of light sensors, automated soldering), which is particularly advantageous for industrial mass production. SMD light sensors typically have a housing, in particular a plastic housing, around the actual chip. Alternatively, so-called "flip chip light sensors" can be used. Alternatively, light sensors with chip-on-board technology can be used, in which the semiconductor chips are arranged without a housing directly on the printed circuit board (PCB) or the flexible printed circuit board (FPC) and connected thereto and are preferably contacted electrically.

The terms "light sensor", also called "photodetector", "optical detector", or "optoelectronic sensor" refer to electronic components that convert light, in particular using the photoelectric effect, into an electrical signal or exhibit electrical resistance depending on the incident radiation. In optoelectronics and also in the context of the present invention, the term "light" refers not only to visible light, but also to invisible infrared light and ultraviolet radiation.

For light sensors in the visible spectral range, photodiodes that are sensitive in the visible spectral range are preferably used. Advantageously, the spectral sensitivity distribution should be aligned with that of the human eye such that the amount of light measured matches the amount of light perceived by the vehicle occupants as well as possible. Unwanted switching operations that are caused by radiation not perceived as relevant by humans can be avoided. There is an advantageous adaptation when the photodiode has sensitivity in the entire spectral range between 500 nm and 600 nm, which corresponds to at least 50% of its sensitivity maximum, preferably at least 60%. The sensitivity maximum should be in the range from 450 nm to 600 nm, in particular in the range from 490 nm to 570 nm. Sensitivity can also be referred to as detection efficiency and can be quantified as the ratio of photons detected to the total number of photons of the respective wavelengths impacting the photodiode. The desired spectral sensitivity is ideally influenced by the type of active material of the photodiode. However, alternatively, an optical filter can be used to achieve the desired spectral sensitivity, for example, a filter film arranged externally to the photodiode. It goes without saying that this film is part of the photodiode or of the protective layer.

The circuit board can also be referred to as a card, printed circuit, or printed circuit board (PCB). It serves for mechanical attachment and electrical connection of the photodiodes arranged thereon. Printed circuit boards are made of electrically insulating material, in particular plastic, with conducting connections (conductor tracks) adhering thereon. The conductor tracks can have local widenings that serve as soldering pads for the components.

In a preferred embodiment, the printed circuit board is a flexible printed circuit board, also known as a flexboard. Such printed circuit boards are formed from flexible, bendable polymer films, for example, polyimide films. They have a thickness of preferably less than 0.38 mm and greater than 50 μm, particularly preferably of 120 μm to 180 μm. Therewith, particularly good results are achieved in terms of flexibility, on the one hand, and stability, on the other. Because of the flexibility and the low thickness, flexible printed circuit boards are particularly suitable for being laminated into a composite pane, in particular a curved composite pane.

When the light sensors are SMD components, an SMD printed circuit board is expediently used.

The printed circuit board can be arranged directly on one of the panes, in particular with the side facing away from the light sensor on the exterior-side surface of the inner pane. It has been demonstrated that the presence of the physically limited printed circuit board does not result in a substantial reduction in the stability of the laminate. The printed circuit board can, however, also be arranged between two thermoplastic layers, i.e., between two plies of the thermoplastic intermediate layer.

The printed circuit board has at least two connection pads for external electrical contacting (for example, anode and cathode). These connection pads serve for connecting the printed circuit board to external evaluation and control electronics via connection cables in order to forward the current pulse generated by the light sensor upon incidence of light to the evaluation and control electronics. The contacting of the connection pads is preferably done with a flat conductor (also called a flat strip conductor or film conductor), comprising an electrically conducting film and an optional, polymeric sheathing, which must, of course, have an opening at the connection point. Preferably, a flat conductor is connected to the connection points of the printed circuit board, for example, via a soldering compound or an electrically conductive adhesive. Preferably, a multipole flat conductor is used, with each pole connected to a connection pad. However, alternatively, a separate flat conductor can also be used for each connection pad. The flat conductor preferably has, on its end away from the printed circuit board, a plug connector (plug or coupling) for connection to additional cables of the vehicle's electrical system.

The printed circuit board is preferably arranged completely within the interior of the composite pane and contacted by a flat conductor that extends out of the composite pane beyond the side edge. The contacting of the printed circuit board by the flat conductor is done before the production of the composite pane, during which the printed circuit board is then arranged in the composite stack such that it is arranged completely within the area of the panes. The advantage consists in a reduced risk of breakage for the printed circuit board which is typically more susceptible to damage than is the flat conductor.

Alternatively, the printed circuit board can also extend out of the interior of the composite pane beyond its side edges, with the light sensors arranged in the interior of the composite pane and the connection pads for the connection cable arranged outside the composite pane. The contacting of the printed circuit board by the connection cable can then be done after the production of the composite pane. Thus, the composite pane with the integrated light sensor can, for example, be sold without a connection cable to the automaker, who then, before installation of the composite pane, undertakes the contacting. It goes without saying that the flat conductor can also be connected to the printed circuit board in advance and the composite pane with an integrated light sensor provided together with the connected flat conductor.

The printed circuit board and the flat conductor with the plug connector can also be formed in one piece such that the flat conductor is, so to speak, an integral component of the printed circuit board with a shared polymeric sheathing. Such a printed circuit board has advantages from a process technology standpoint since, during the production of the composite pane, the soldering of the flat conductor onto the connection pads of the circuit board is eliminated.

That side edge beyond which the printed circuit board or a flat conductor connected thereto extends is, in the context of the invention, referred to as the side edge that is associated with the printed circuit board or the light sensor.

In an advantageous embodiment, a plurality of light sensors, preferably at least two, particularly preferably four light sensors, are arranged on one printed circuit board. Better spatial resolution of the radiation direction of the light detected can be achieved with multiple light sensors.

In an advantageous embodiment, the distance between adjacent light sensors is at most 3 cm, preferably at most 2 cm, for example, from 1 cm to 2 cm.

The printed circuit board has, in a preferred embodiment, a maximum width of at least 15 cm, preferably at least 20 cm. In the context of the invention, "width" refers to the dimension substantially parallel to the side edge associated with the light sensor. The maximum width is the greatest width that occurs along the entire length of the printed circuit board if the width is not constant. In other words, the printed circuit board preferably has at least one section with a width of at least 15 cm, particularly preferably at least 20 cm.

In a preferred embodiment, the printed circuit board has an end section and a lead section, with the lead section having a smaller width than the end section. The light sensors are arranged in the end section; and the connection pads for the connection cable, in the lead section, in particular in the vicinity of the end of the lead section facing away from the end section. The lead section is less distant from the associated side edge than the end section and preferably extends out of the composite pane, beyond this side edge. Such a printed circuit board is implemented, for example, in a T-shape, wherein the transverse bar (being the end section) is turned away from the associated side edge. The lead section preferably has a length of 1 cm to 12 cm, particularly preferably of 2 cm to 8 cm. The lead section preferably has a width of 2 cm to 15 cm, particularly preferably of 3 cm to 10 cm. The end section preferably has a length of 0.5 cm to 3 cm, particularly preferably of 1 cm to 2 cm. The end section preferably has a width of 15 cm to 40 cm, particularly preferably of 20 cm to 30 cm. With such a printed circuit board, particularly good results are obtained in terms of efficiency and space-saving design.

Alternatively, however, the printed circuit board can also be rectangular. Theoretically, it can then also be divided into an end section with the light sensors and a lead section with the electrical contacts, wherein, however, the lead section and the end section have the same width.

In an advantageous embodiment, the composite pane includes a plurality of light sensors, i.e., a plurality of printed circuit boards with, in each case, at least one photodiode. This offers, on the one hand, the advantage of redundancy: in the event of failure of one light sensor, functionality can nevertheless be ensured by the one or more other light sensors. On the other hand, the presence of multiple light sensors distributed over the composite pane enables distinguishing between a local, virtually punctiform source of radiation, such as a streetlight, and the ambient light. Misinterpretations by the evaluation and control electronics can thus be avoided. For example, it is possible to avoid a streetlight being misinterpreted as bright ambient light and the vehicle lighting being turned off at night as a result. Also possible is a determination of the directional dependence of the incident radiation via a comparison of the intensities that are measured by the various light sensors.

The direction of incidence of the light detected in the entire half-space above the outer pane can be determined by a plurality of light sensors on a printed circuit board or by the use of a plurality of light sensor elements. Thus, for example, the current position of the sun can be determined.

It goes without saying that, in addition to the light sensors, other sensors can be arranged on the circuit board and, in particular, on the PCB, which is particularly economical and easy to process in terms of production technology.

In a preferred embodiment, the width of each light sensor is less than 2 mm. Here, the term "width" means the maximum lateral extension in a plane parallel to the printed circuit board. Thus, the light sensors can be unobtrusively integrated into the composite pane. Any necessary holes in a masking print behind which the light sensor is to be hidden can be designed small and unobtrusive. The height of the light sensors (extension perpendicular to the printed circuit board) is preferably less than 0.7 mm, particularly preferably less than 0.6 mm. The light sensors can then be integrated into the composite pane with the use of the standard thickness of the thermoplastic intermediate layer of 0.76 mm.

The inner pane and the outer pane are preferably made of glass, particularly preferably soda lime glass, which has proven itself for window glass. However, the panes can also be made of other types of glass, for example, of borosilicate glass or aluminosilicate glass. In principle, the panes can also alternatively be made of plastic, in particular polycarbonate (PC) or polymethyl methacrylate (PMMA). It goes without saying that the composite pane can also have one glass pane and one plastic pane.

The thickness of the panes can vary greatly and thus be ideally adapted to the requirements of the individual case. Preferably, the thicknesses of the outer pane and the inner pane are from 0.5 mm to 10 mm, particularly preferably from 1 mm to 5 mm, most particularly preferably from 1.2 mm to 3 mm.

The outer pane, the inner pane, or the intermediate layer can be clear and colorless but also tinted, frosted, or colored. The total transmittance through the composite pane is, in a preferred embodiment, greater than 70%, in particular when the composite pane is a windshield. The term "total transmittance" is based on the process for testing the light permeability of motor vehicle windows specified by ECE-R 43, Annex 3, § 9.1.

The outer pane and the inner pane can be made of non-prestressed, partially prestressed, or prestressed glass.

The composite vehicle pane is preferably curved in one or a plurality of spatial directions, as is customary for motor vehicle panes, with typical radii of curvature in the range from approx. 10 cm to approx. 40 m. The composite glass can, however, also be flat, for example, when it is intended as an architectural pane, for example, in building glazing, or as a pane for buses, trains, or tractors.

The intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The intermediate layer is formed from at least one thermoplastic film. The thickness of a thermoplastic film is preferably from 0.2 mm to 2 mm, particularly preferably from 0.3 mm to 1 mm, for example, 0.38 mm or 0.76 mm. The intermediate layer can also be implemented as a so-called "acoustic film", which has a noise-damping effect. Such films typically consist of at least three layers, with the middle layer having higher plasticity or elasticity than the outer layers surrounding it, for example, as a result of a different plasticizer content.

The printed circuit board is preferably arranged in a nontransparent region of the composite glass pane such that it is hardly visible or not at all. In this region, vision through the pane is prevented by an opaque element. For this, in the automotive sector, opaque masking prints on one or on both panes are customary. Alternatively, however, vision through the pane can also be prevented, for example, by a colored thermoplastic film of the intermediate layer or an opaque insert element. Preferably, the opaque element is arranged on the interior side relative to the light sensor, thus having less distance from the interior or from the interior-side surface of the inner pane than the light sensor. Then, the light sensor is not visible from the inside, while light can strike it from the outside such that it can fulfill its function. It can be particularly preferable for opaque elements to be mounted in front of and behind the printed circuit board in the direction of vision, i.e., an opaque element, in each case, on the interior side and on the exterior side relative to the light sensor. Then, the printed circuit board is visible neither from the outside nor from the inside. In order for the light sensor to be able to fulfill its function, the opaque element must, of course, have openings at the position of the light sensors, since, otherwise, detection of light would not be possible. An opaque element arranged on the interior side relative to the light sensor is preferably realized by a masking print on the inner pane; an opaque element arranged on the exterior side relative to the light sensor, by a masking print on the outer pane. Masking prints are customary for motor vehicle panes outside the central vision region to conceal add-on parts or to protect the adhesive with which the motor vehicle pane is bonded to the body against UV radiation. The masking print typically consists of a black or dark enamel applied and baked in a screen printing process.

Alternatively, however, it can also be desirable not to hide the printed circuit board by a masking print such that it is visible from the outside. In particular, this increases the production tolerances since the printed circuit board need not be so precisely positioned in order to coincide with any openings in the black print.

It is also possible to combine the light sensor according to the invention with other sensors, enabling advantageously space-saving construction. The light sensor can, for example, be combined with a rain sensor, in particular a capacitive rain sensor which determines the presence of moisture on the pane by means of a capacitive change of at least one electrode. The conductive structures serving as electrodes can, for example, be arranged on the printed circuit board or on the inner pane. The rain sensor and the light sensor are preferably arranged in spatial proximity to one another or spatially superimposed, thus enabling realization of a space-saving combined sensor element.

The invention further includes a method for producing a composite vehicle pane with an integrated light sensor. Here, first, an outer pane, an inner pane, at least one thermoplastic film, and at least one light sensor situated on a circuit board are arranged as a stack such that the film and the light sensor are arranged between the outer pane and the inner pane. The two panes and the film or films positioned therebetween are, of course, arranged one atop another flat and substantially congruent. The printed circuit board with the light sensors is inserted into a region of this stack. The stack is subsequently subjected to customary methods for producing composite panes. The outer pane is bonded to the inner pane by lamination via a thermoplastic intermediate layer, which is formed during the process from the at least one thermoplastic film. This is done using customary methods known per se to the person skilled in the art, for example, autoclave methods, vacuum bag methods, vacuum ring methods, calender methods, vacuum laminators, or combinations thereof. The bonding of the outer pane and the inner pane is customarily done under the action of heat, vacuum, and/or pressure.

Preferably, the printed circuit board is connected in advance to a flat conductor and only arranged in the stack thereafter. Preferably, it is arranged such that the printed circuit board is arranged completely within the area of the panes and the flat conductor extends beyond its side edges. The connection between the flat conductor and the connection pads of the printed circuit board can be done, for example, by soldering or via an electrically conductive adhesive.

If the composite vehicle pane is to have a curvature, as customary in particular for passenger cars, the panes are subjected, before lamination, to a bending process, for example, by gravity bending, suction bending, and/or press bending. Typical bending temperatures are from 500° C. to 700° C.

Preferably, an opaque masking print is applied on the edge region of the outer pane and the inner pane before the lamination and before the optional bending. For this, typically, a black or dark enamel is applied by screen printing and baked before the lamination, in particular, before the bending or during the bending.

The printed circuit board can be placed directly on one of the panes, in particular with the side facing away from the light sensors on the exterior-side surface of the inner pane. All films of the intermediate layer are then arranged on one side of the printed circuit board. However, alternatively, the printed circuit board can also be inserted between two thermoplastic films that enclose the circuit board in a sandwich-like manner.

A thermoplastic film not further processed in advance can be used. During lamination, the heated, flowable thermoplastic material flows into the spaces around the light sensors and the printed circuit board such that a stable composite is ensured.

In order to improve the optical quality of the composite pane, it can be advantageous to prepare the thermoplastic film (or at least one thermoplastic film in the case of use of a plurality of films) by providing openings for the light sensor.

Large-area holes, into which the entire printed circuit board is inserted, can be produced in the film. Preferably, the printed circuit board is then surrounded sandwich-like by two relatively thin film sections in order to compensate for the difference in height between the printed circuit board and the film and to ensure the adhesion of the composite.

Alternatively, in an advantageous embodiment, the thermoplastic film is provided with holes or indentations before lamination. These holes or indentations are coordinated in size, position, and arrangement with the light sensor(s). This means that the lateral dimensions of the holes or indentations substantially correspond to the dimensions of the light sensors or are slightly larger, in particular are at most 150% or at most 120% of the dimensions of the light sensors. The position of the holes or indentations corresponds to the desired positioning of the light sensor in the composite pane to be manufactured. The arrangement of the holes or indentations relative to one another corresponds to the arrangement of the light sensors relative to one another if a plurality of light sensors are used. The holes and indentations, on the one hand, and the light sensors, on the other, are thus, so to speak, in a key-to-keyhole relationship with one another. At the time of arrangement of the stack for lamination, the light sensors are inserted into the holes or indentations. Thus, the light sensors are effectively embedded in the intermediate layer. Moreover, the position of the light sensors is defined during production, which is advantageous in terms of mass production. The holes or indentations can be produced just prior to the lamination. However, the films with the defined holes or indentations can also be prepared in large quantities or even procured in this form from the film supplier.

The film can be provided with through-holes. If the film has a thickness that is greater than the height of the light sensors, an actually undesirable cavity remains. This can, optionally, for example, be filled by small cutouts of the thermoplastic film. More advantageously, since it is simpler from a process technology standpoint, the film can be provided with indentations whose depth substantially corresponds to the height of the light sensors instead of through-holes. The undesirable cavity is thus avoided without necessary postproduction work. The indentations are introduced, for example, by punching.

The invention also includes the use of a composite pane according to the invention with an integrated light sensor as a vehicle pane, preferably in water, land, or air vehicles, and, in particular, preferably as a windshield, rear window, or roof panel of a motor vehicle, in particular of a passenger car. Preferably, the at least one light sensor is connected to evaluation and control electronics of the vehicle.

As a function of the ambient light measured by the at least one light sensor, one or a plurality of the following switching states can, for example, be controlled;
the switching state of the vehicle lighting (in particular headlights, taillights, and side marker lights): upon dropping below a predefined threshold value, the lighting is turned on; upon exceeding the predefined threshold, the lighting is turned off.
the transmittance properties of a region of the composite pane that is equipped with an electrically switchable or controllable functional element. Said region of the pane is in particular a switchable or controllable glare shield in the upper third of the pane (also known as a "shaded band"). The switching state can be controlled as a function of the absolute amount of ambient light or as a function of the position of the sun derived by location-dependent measurement with multiple photodiodes or light sensor elements. In particular, with a low position of the sun, the glare shield is necessary. The controllable functional element can be, for example, an SPD element (suspended particle device) or an LC element (liquid crystal) or an electrochromic element.
the intensity (brightness) of display elements in the vehicle interior, for example, LED display elements or OLED display elements or projections with HUD technology. The display elements are, for example, warning lights or information displays, in particular in the form of pictograms or alphanumeric indicators.

The invention is explained in detail in the following with reference to drawings and exemplary embodiments. The drawings are schematic representations and not to scale. The drawings in no way restrict the invention.

They Depict:

FIG. 1A a schematic representation of the measuring principle according to the invention with light irradiation from the right, FIG. 1B a schematic representation of the measuring principle according to the invention with light irradiation from the left, FIG. 2A a plan view of an embodiment of the composite vehicle pane according to the invention, FIG. 2B a cross-sectional representation along the section line A-A' through the composite vehicle pane of FIG. 2A, FIG. 2C an enlarged and simplified representation of the detail Z of FIG. 2A in accordance with one exemplary embodiment, FIG. 3 an enlarged representation of the detail Z of FIG. 2A with another exemplary embodiment, FIG. 4A an enlarged representation of the detail Z of FIG. 2A with another exemplary embodiment FIG. 4B an enlarged representation of the detail Z of FIG. 2A with another exemplary embodiment FIG. 4C an enlarged representation of the detail Z of FIG. 2A with another exemplary embodiment FIG. 5A a cross-sectional representation along the section line B-B' of FIG. 5B of another embodiment of a light sensor according to the invention, FIG. 5B a plan view of the light sensor of FIG. 5A, FIG. 6 a simplified representation of the detail Z of FIG. 2A with light sensors in accordance with FIGS. 5A and 5B, FIG. 7 a flow chart of an embodiment of the method according to the invention.

FIGS. 1A and 1B depict in each case schematic representations of the measuring principle according to the invention with different directions of light incidence. FIGS. 1A and 1B depict a simplified representation of a light sensor 4 according to the invention with a shadow mask 11. Here, the light sensor 4 is, for example, a photodiode 4. The photodiode 4 contains a semiconductor chip 4.3, in which a light-sensitive surface 4.1 is arranged on the light incidence side. The light-sensitive surface 4.1 is covered with a protective layer 4.2. The protective layer 4.2 is transparent to the wavelength of incident light to which the light-sensitive surface 4.1 is sensitive. The light-sensitive surface 4.1 has, for example, a square base with a width (i.e., with a side length) of 1000 µm. The protective layer 4.2 has a thickness d of, for example, 500 nm. The distance a between the shadow mask 11 and the light-sensitive surface 4.1 is, for example, 1000 µm and thus corresponds roughly to the width of the light-sensitive surface 4.1.

Arranged above and in direct contact with the protective layer 4.2 is a shadow mask 11 that shades half of the light-sensitive surface 4.1, in the case of orthogonal projection (which corresponds to perpendicular light incidence). The shadow mask 11 is nontransparent to the wavelength of incident light to which the light-sensitive surface 4.1 is sensitive.

As investigations by the inventors showed, the leverage or amplification effect due to the layer thickness d of the transparent protective layer 4.2 is sufficient to determine the angle of incidence of the light with sufficient accuracy for the application of a vehicle glazing. At the same time, the arrangement depicted has only a small total thickness such that it can be integrated into a composite pane.

It goes without saying that, here and in the following, other sensors that are suitable to detect visible light or invisible infrared or ultraviolet light can also be used as the light sensor 4.

Figure 1A:
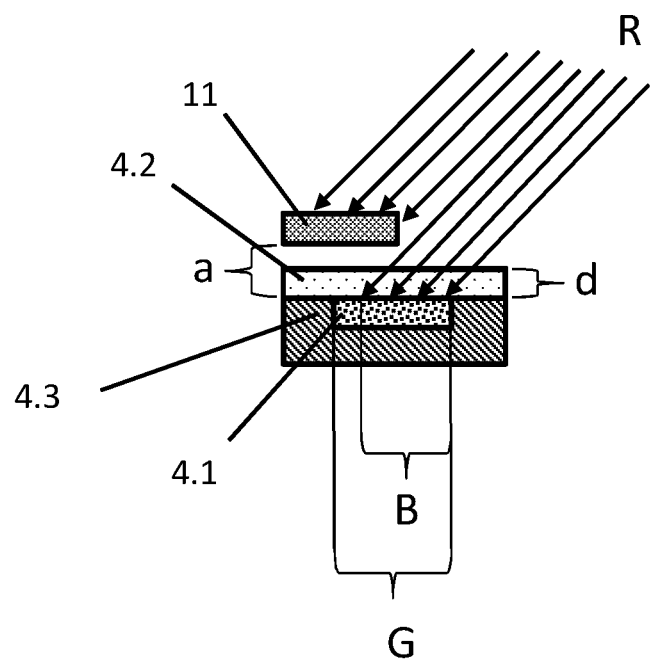
FIG. 1A depicts the situation of light incidence from the right (symbolized by the arrows R). Due to the geometric shadow of the light rays R on the light-sensitive surface 4.1, the illuminated area B is roughly the full total area G of the light-sensitive surface 4.1.
Figure 1B:
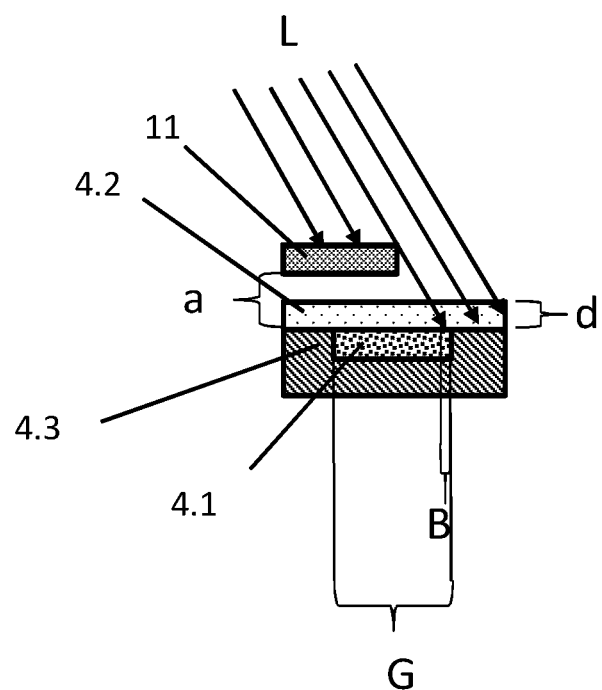
FIG. 1B depicts the situation of light incidence from the left (symbolized by the arrows L). Due to the geometric shadow of the light rays L on the light-sensitive surface 4.1, the illuminated area B is very small compared to the total area G of the light-sensitive surface 4.1.

The angular resolutions of the arrangement according to the invention in FIG. 1A and FIG. 1B can depend on the direction of incidence. In other words, the arrangement depicted in FIGS. 1A and 1B can have a different sensitivity or angular resolution for the different directions of light incidence (in this case, right and left). Therefore, it is advantageous to use at least two light sensors 4 with two shadow masks 11 arranged in opposite directions.

Figure 2A:
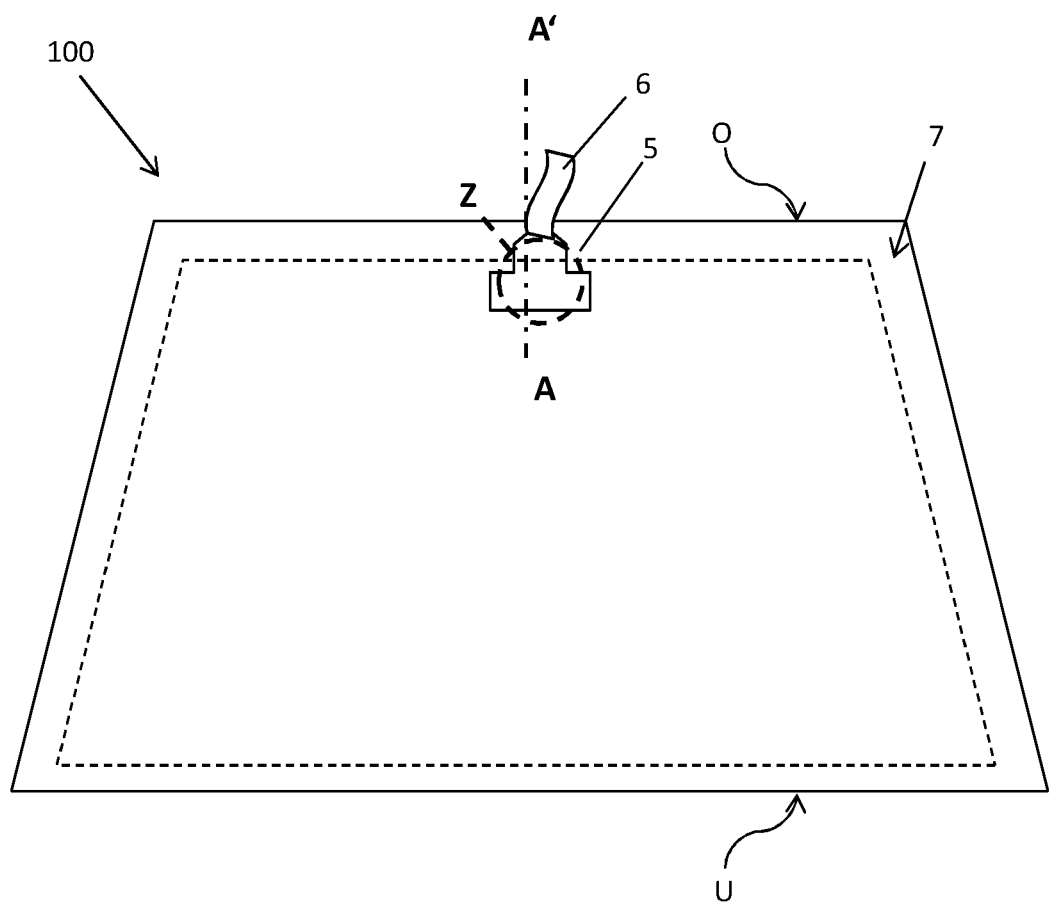
Figure 2B:
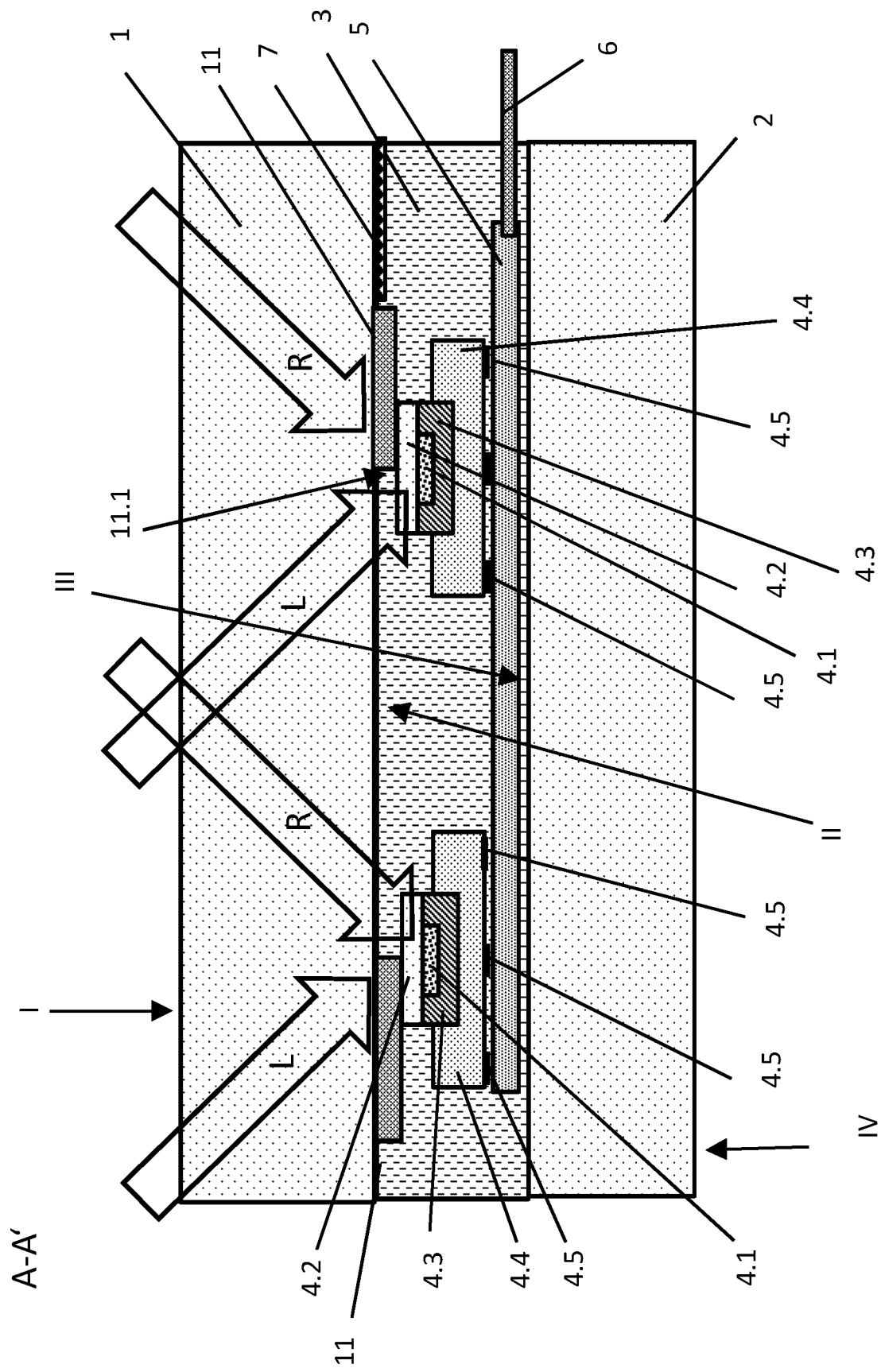
Figure 2C:
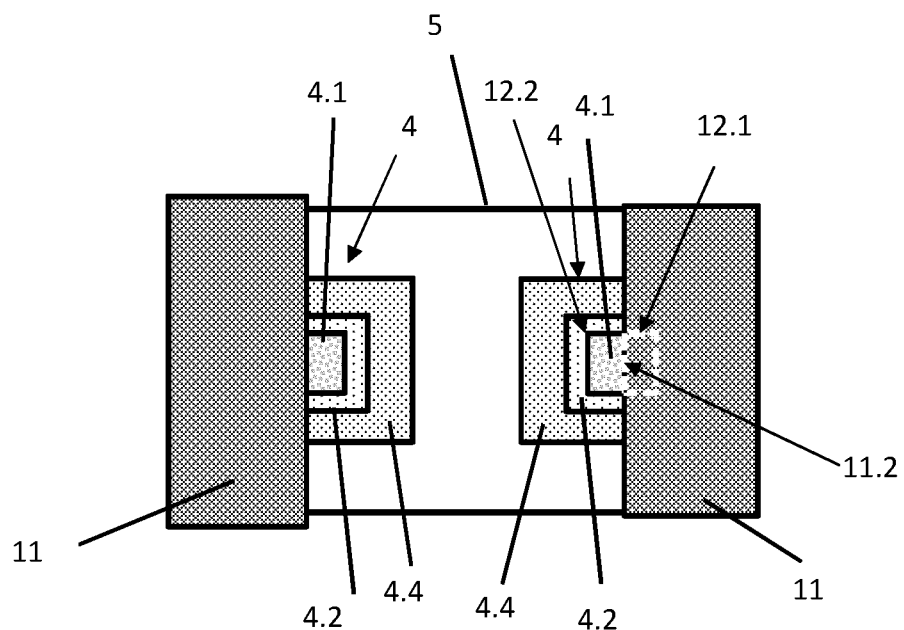

FIGS. 2A, 2B, and 2C depict in each case a detail of a composite pane 100 according to the invention with an integrated light sensor 4 using the example of a composite vehicle pane. The composite pane 100 is made up of an outer pane 1 (with an exterior-side surface I and an interior-side surface II) and an inner pane 2 (with an exterior-side surface III and an interior-side surface IV) that are areally bonded to one another via a thermoplastic intermediate layer 3. The outer pane 1 and the inner pane 2 are made, for example, of soda lime glass and have, for example, a thickness of 2.1 mm. The intermediate layer 3 is formed from a 0.76-mm-thick film made of polyvinyl butyral (PVB). The composite pane is intended, for example, as a windshield of a motor vehicle. It goes without saying the composite pane can also be a different vehicle pane, for example, a roof panel.

In this example, the composite pane 100 is equipped with two light sensors 4 and, for example, with two photodiodes 4. As shown in detail in FIG. 2B, each photodiode 4 consists of a housing 4.4 in which a semiconductor chip 4.3 is arranged. The semiconductor chip 4.3 can be contacted via solder connections 4.5. The semiconductor chip 4.3 contains a light-sensitive surface 4.1 that is covered and protected by a transparent protective layer 4.2. The protective layer 4.2 can, for example, be made of a thin layer of silicon oxide or silicon nitride. Particularly important here is a defined distance a between the light-sensitive surface 4.1 and the shadow mask 11, which can have further layers or customary electrical leads in addition to the protective layer 4.2.

The photodiodes 4 are arranged on one common flexible printed circuit board 5, which is arranged, by way of example, in the center of the composite pane 100 and in the region of the upper edge O. It goes without saying that one or more light sensors 4 can, in each case, also be arranged at different locations on the composite pane 100, for example, in the region of the corners of the composite pane 100 and/or at the side edges or at the lower edge U. The printed circuit board 5 is arranged completely within the composite pane. It is positioned directly on the exterior-side surface III of the inner pane 2 and is bonded to the outer pane 1 via the intermediate layer 3. It has two electrical connection pads (not shown) that are soldered, in each case, to one pole of a two-pole flat conductor as a connection cable 6. The connection cable 6 extends out of the composite beyond the upper edge O. The connection cable 6 serves to electrically connect the printed circuit board 5 via additional connector cables (typically round cables) to evaluation and control electronics as part of the vehicle's onboard electronics. The evaluation and control electronics analyze the signals of the photodiodes 4—thus, for example, the evaluation and control electronics can switch the vehicle lighting on or off as a function of the amount of ambient light determined by the photodiodes 4, regulate a darkening (not shown here), or control the air conditioning system.

As a result of the plurality of light sensors 4, the system can distinguish between the ambient light that is measured by all light sensors 4 with substantially equal intensity and a local light source such as a streetlight or sunlight, which is measured with sharply different intensity by the distributed light sensors 4. As a result of the additional angular resolution according to the invention of the light sensors 4 according to the invention with the shadow mask 11, it is possible to draw conclusions as to the exact direction of incidence of the light source.

Suitable as light sensors 4 are, for example, SMD photodiodes of the type APDS-9005 from the company Avago Technologies. They have advantageously small dimensions (height 0.55 mm, width 1.6 mm, depth 1.5 mm) and a spectral sensitivity distribution that very closely mimics that of the human eye. The sensitivity maximum is approx. 500 nm; and in the entire range from 500 nm to 600 nm, the sensitivity is more than 60% of the maximum value at 500 nm. This ensures that the amount of light measured by the light sensor also matches that considered relevant by humans.

The printed circuit board 5 is a flexible printed circuit board, comprising an approx. 150-µm-thick polyimide film and conductor tracks printed thereon. Here, for example, all photodiodes 4 of the printed circuit board are arranged in the end section, whereas the lead section serves for the connection to the connection cable 6. Two connection pads (not shown) that correspond to the two poles of the system of conductor tracks and that are in each case soldered to one pole of the two-pole connection cable 6 are arranged at the end of the lead section.

The composite pane 100 has, as is customary for windshields, a frame-like opaque masking print 7. The masking print 7 is implemented, for example, as printed and baked, black enamel on the interior-side surface II of the outer pane 1. The printed circuit boards 5 are arranged in the region of the masking print 7 such that they are visible neither from the outside nor from the inside. The outer masking print 7 on the outer pane 1 has holes at the sites of the photodiodes 4 such that light can fall on the photodiodes 4 and the light sensors 4 can fulfill their function.

In this example, the shadow mask 11 is likewise implemented as a black imprint on the interior-side surface II of the outer pane 1. Alternatively, the shadow mask 11 can also be implemented as an inserted or glued-on light-impermeable film. Alternatively, the shadow mask 11 can also be implemented directly as an imprint on the light sensor 4 (and, here, on the photodiode 4) and thereby on the transparent protective layer 4.2, as is explained in FIGS. 5A, 5B, and 6.

Figure 3:
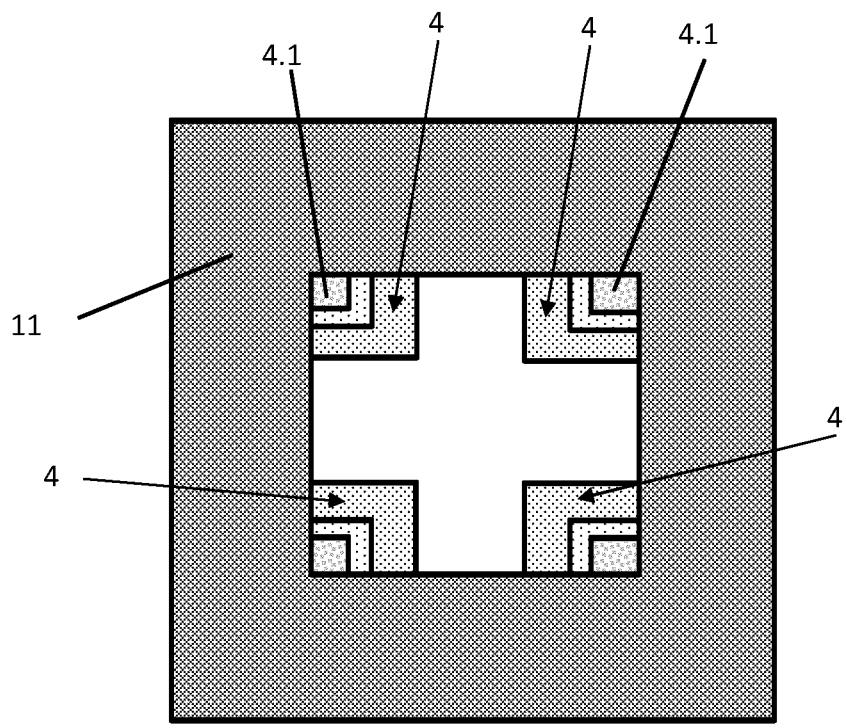

FIG. 3 depicts another exemplary embodiment of the composite pane 100 of FIG. 2C so reference is made to the description there; and in the following, only the differences are described. The composite pane of FIG. 3 has, for example, four photodiodes 4. Here, the shadow mask 11 is implemented as a circumferential frame, under the respective inner corners of which a light-sensitive surface 4.1 of a photodiode 4 is arranged in each case. By suitably evaluating the electrical signals, it is possible to precisely determine the location of incident light in the hemispherical space around the outer pane.

Figure 4A:
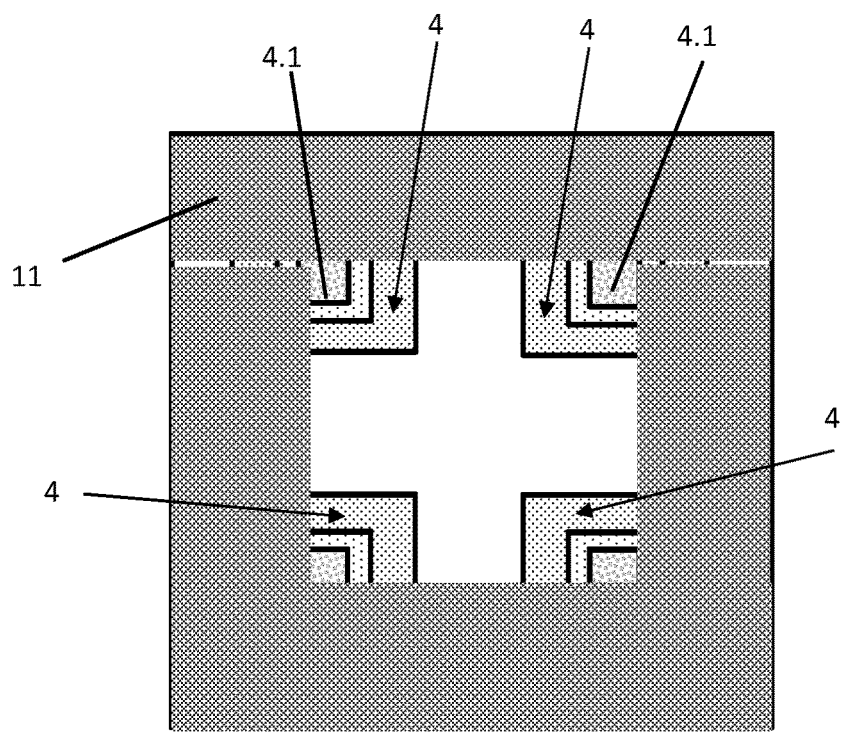
Figure 4B:
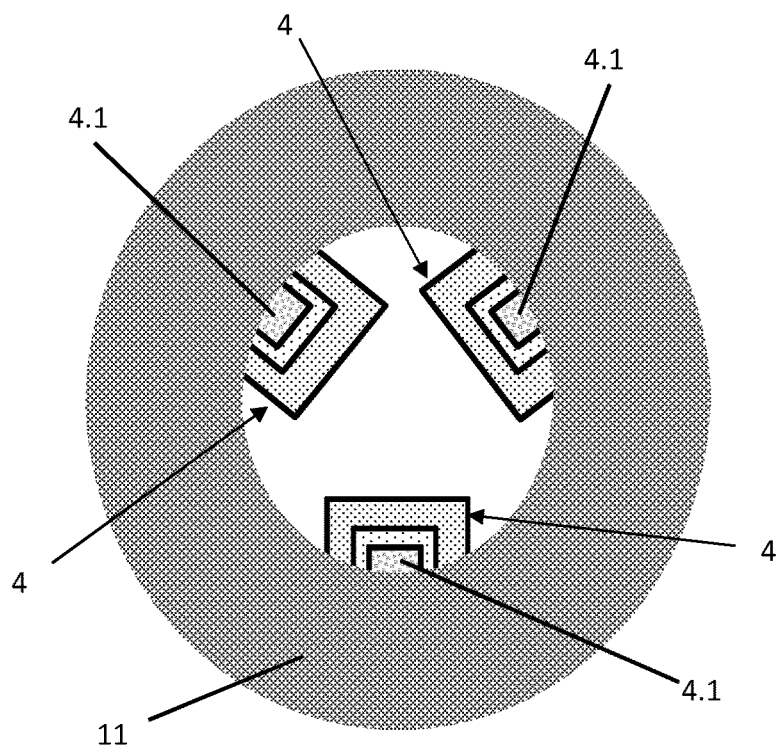
Figure 4C:
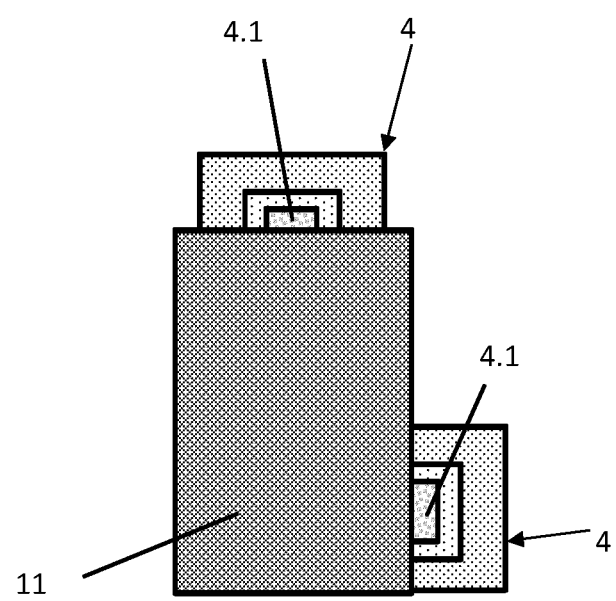

FIGS. 4A, 4B, and 4C depict other preferred embodiments. Here, as well, reference is made to the description concerning FIGS. 2A, 2B, and 2C.

It goes without saying that the frame depicted in FIG. 3 need not be closed all the way around, but can, instead, consist of individual sections. In FIG. 4A, this is a U-shaped frame that has a further section on the open end. This further section can, for example, also be part of the masking print 7.

FIG. 4B depicts an exemplary embodiment with a shadow mask consisting of a circular ring-shaped frame under which three photodiodes 4 are arranged. Here, again, by suitable evaluation of the electrical signals, a precise hemispherical locating of incident light can be carried out.

FIG. 4C depicts another exemplary embodiment with a shadow mask 11 with a rectangular shape with two photodiodes 4. The photodiodes 4 are arranged on adjacent sides of the rectangle such that light incidence can be measured in two mutually orthogonal directions.

Figure 5A:
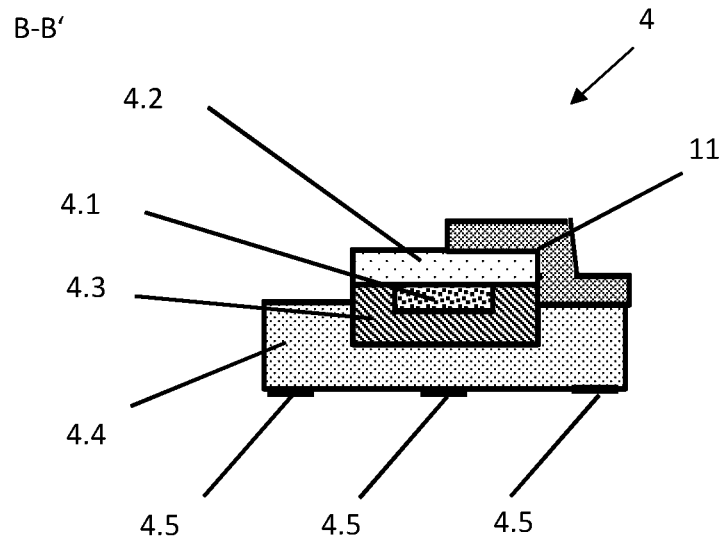
Figure 5B:
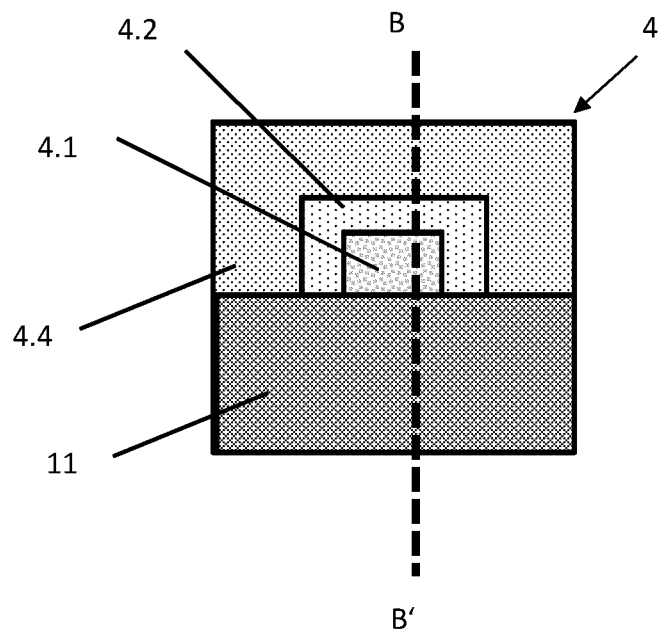

FIGS. 5A and 5B depict a cross-sectional view and a plan view of another exemplary embodiment of a light sensor 4 according to the invention, using the example of a photodiode 4 according to the invention. In this case, the cross-section of FIG. 5A along the section line B-B' of FIG. 5B is selected. Here, the shadow mask 11 is arranged on the photodiode 4 and fixedly connected thereto. The shadow mask 11 is, for example, a color or lacquer layer, applied on the photodiode 4, for example, by printing or stamping. Such photodiodes 4 according to the invention have the particular advantage that the shadow mask 11 is arranged in a defined position relative to the photodiode 4. This offers greater flexibility and enables greater installation tolerances, compared to an arrangement in which the shadow mask 11 is fixedly arranged on the outer pane 1, and the photodiode 4 must then be precisely aligned relative to the shadow mask 11.

Figure 6:
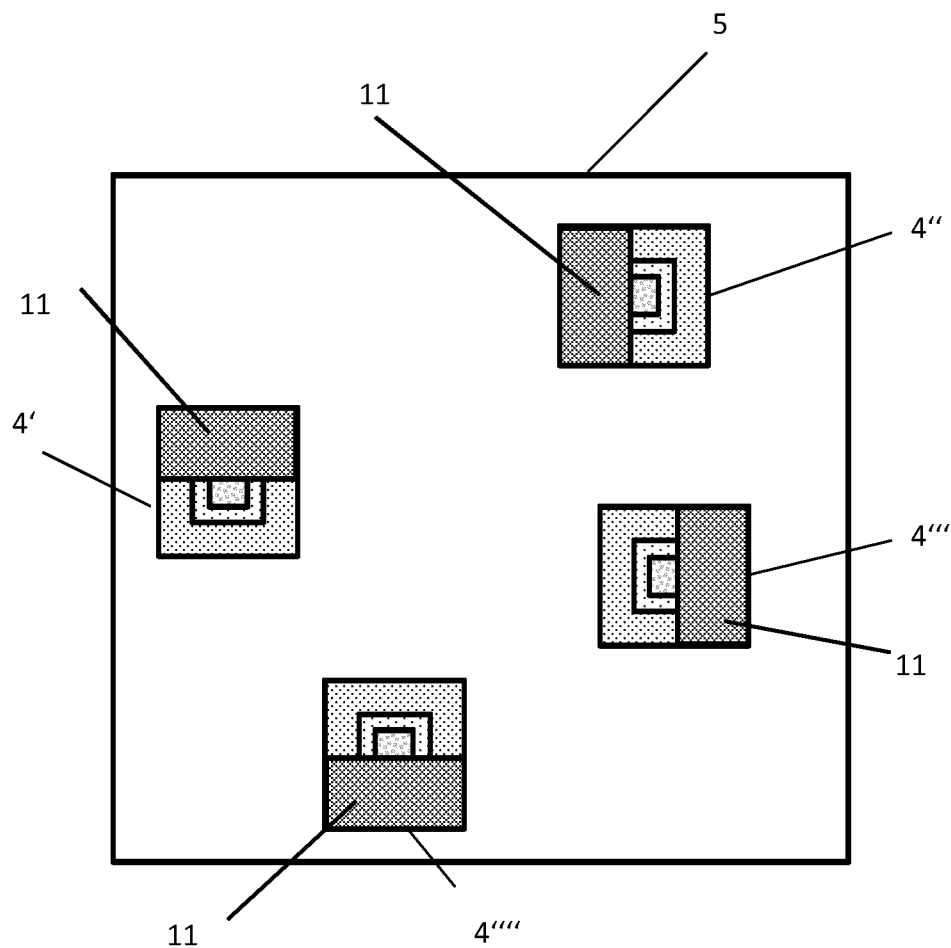

FIG. 6 depicts an exemplary application of the photodiodes 4 of FIGS. 5A and 5B. In this case, the photodiodes 4 are freely arranged on a printed circuit board 5. This is particularly advantageous, if still more sensors or actuators are to be arranged on the printed circuit board 5 or if the printed circuit board 5 has a particularly irregular shape due to the technical conditions. Here, the shadow masks 11 are arranged in four different directions relative to the photodiode 4: at the top for the photodiode 4', on the left for the photodiode 4", on the right for the photodiode 4'", and at the bottom for the photodiode 4"", in a plan view of the outer pane 1 of a composite pane 100. Here again, by suitable evaluation of the electrical signals, a precise location of incident light within the hemispherical space can be carried out.

Figure 7:
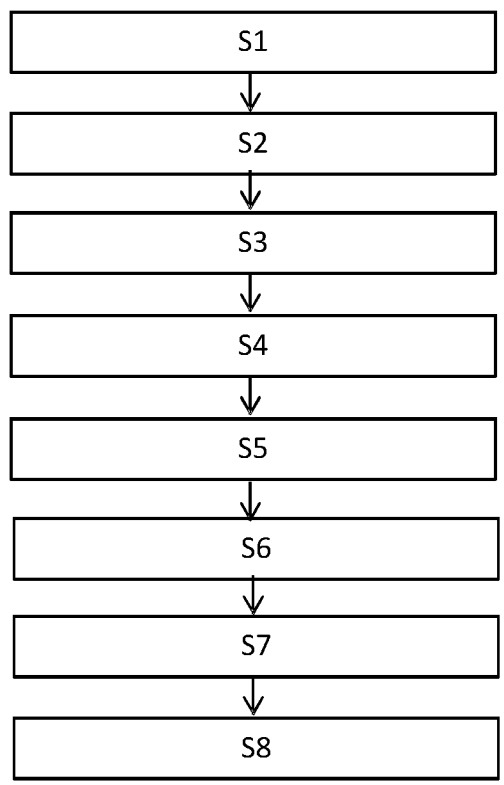

FIG. 7 depicts a flow chart of an exemplary embodiment of the method according to the invention for producing a composite pane 100 with an integrated light sensor 4 with the following exemplary steps:
S1: Producing a printed circuit board 5 with light sensors 4;
S2: Connecting the printed circuit board 5 to a connection cable 6;
S3: Producing indentations in a thermoplastic film, which are matched in size, position, and arrangement to the light sensors 4;
S4: Inserting the light sensors 4 into the indentations of the film;
S5: Providing an inner pane 2;
S6: Placing the thermoplastic film with the printed circuit board 5 on the inner pane 2;
S7: Placing an outer pane 1 on the thermoplastic film;
S8: Laminating the outer pane 1 and the inner pane 2 to form a composite glass, wherein an intermediate layer 3 is formed from the thermoplastic film.

LIST OF REFERENCE CHARACTERS

1 outer pane
2 inner pane
3 thermoplastic intermediate layer
4, 4', 4", 4'", 4"" light sensor, photodiode
4.1 light-sensitive surface
4.2 transparent protective layer
4.3 semiconductor chip
4.4 housing
4.5 solder connection
5 printed circuit board (PCB)
6 connection cable/flat conductor
7 opaque masking print
11 shadow mask
11.1 edge of the shadow mask
11.2 boundary line
12.1 first area of the light-sensitive surface (4.1)
12.2 second area of the light-sensitive surface (4.1)
100 composite pane, composite vehicle pane
O upper edge of the composite pane
U lower edge of the composite pane
I exterior-side surface of the outer pane 1
II interior-side surface of the outer pane 1
III exterior-side surface of the inner pane 2
IV interior-side surface of the inner pane 2
A-A' section line
B-B' section line
B illuminated area of the light-sensitive surface 4.1
a distance of the shadow mask 11 from the light-sensitive surface 4.1
d layer thickness of the protective layer 4.2
G total area of the light-sensitive surface 4.1
R incidence of light from the right
L incidence of light from the left
Z enlarged detail

The invention claimed is:

1. A composite pane, comprising:
an outer pane and an inner pane that are joined to one another via at least one thermoplastic intermediate layer, and
at least one light sensor with a light-sensitive surface that is arranged between the outer pane and the inner pane, wherein
the light-sensitive surface faces the outer pane, and
a shadow mask that covers at least some portions of the light-sensitive surface is arranged between the light-sensitive surface and the outer pane such that only part of the light-sensitive surface is illuminated when light impinges perpendicularly to the shadow mask.

2. The composite pane according to claim 1, wherein a distance between the light-sensitive surface and the shadow mask is from 100 μm to 10000 μm.

3. The composite pane according to claim 1, wherein a distance between the light-sensitive surface and the shadow mask is from 50% to 150% of a width or a length of the light-sensitive surface.

4. The composite pane according to claim 1, wherein the shadow mask exactly covers a first area of the light-sensitive surface completely and does not exactly cover a second area.

5. The composite pane according to claim 1, wherein the shadow mask has, in a detection wavelength range of the light sensor, transmittance less than or equal to 50%.

6. The composite pane according to claim 1, wherein a transparent protective layer is arranged between the light-sensitive surface and the outer pane.

7. The composite pane according to claim 6, wherein the protective layer has a thickness of 10 nm to 1000 nm.

8. The composite pane according to claim 1, wherein the shadow mask is arranged directly on a housing of the light sensor and/or on a transparent protective layer and/or on an interior-side surface of the outer pane.

9. The composite pane according to claim 1, wherein the shadow mask consists of at least one color layer and/or of at least one film.

10. The composite pane according to claim 6, wherein the shadow mask consists of a color layer that is printed or stamped directly onto the transparent protective layer.

11. The composite pane according to claim 4, wherein the shadow mask has a sharp edge between the first area and the second area and/or an edge along a boundary line between the first area and the second area is rectilinear, slightly curved, or orthogonal.

12. The composite pane according to claim 1, wherein the at least one light sensor is arranged on at least one printed circuit board.

13. The composite pane according to claim 1, wherein the composite pane contains at least two light sensors.

14. A method for producing a composite pane with an integrated light sensor according to claim 1, the method comprising:
(a) arranging the outer pane, the inner pane, at least one thermoplastic film, and the at least one light sensor situated on a printed circuit board as a stack such that the at least one thermoplastic film and the at least one light sensor are arranged between the outer pane and the inner pane, and
(b) bonding the outer pane to the inner pane by lamination via the at least one thermoplastic film forming the at least one thermoplastic intermediate layer.

15. A method comprising providing a vehicle pane comprising the composite pane with the integrated light sensor according to claim 1 and detecting light with the integrated light sensor.

16. The method according to claim 15, wherein the at least one light sensor is connected to evaluation and control electronics of a vehicle; and a switching state of a vehicle lighting, transmittance properties of a pane area, a function of an air-conditioning system, a brightness of HUD displays, and/or an intensity of display elements in a vehicle interior are controlled as a function of ambient light measured by the at least one light sensor.

17. The composite pane according to claim 1, wherein the composite pane is a composite vehicle pane.

18. The composite pane according to claim 2, wherein the distance between the light-sensitive surface and the shadow mask is from 500 µm to 1500 µm.

19. The composite pane according to claim 3, wherein the distance between the light-sensitive surface and the shadow mask is from 75% to 125% of the width or the length of the light-sensitive surface.

20. The composite pane according to claim 5, wherein the transmittance is less than or equal to 10%.

21. The composite pane according to claim 1, wherein the at least one light sensor includes a first light sensor and a second light sensor, wherein the light-sensitive surface of the first light sensor and the light-sensitive surface of the second light sensor are spaced apart from each other by a region of the at least one thermoplastic intermediate layer, and wherein the shadow mask covers a portion of the light-sensitive surface of the first light sensor and a portion of the light-sensitive surface of the second light sensor without covering said region of the at least one thermoplastic intermediate layer.

\* \* \* \* \*